Joseph Bonomo
Patsy Deiorio
John Coffaro
INVENTORS

United States Patent Office 2,992,813
Patented July 18, 1961

2,992,813
DOUGH MIXING MACHINE
Joseph Bonomo and Patsy De Iorio, Utica, and John Coffaro, Brooklyn, N.Y., assignors, by direct and mesne assignments, to said Patsy De Iorio
Substituted for abandoned application Ser. No. 464,342, Oct. 25, 1954. This application Apr. 30, 1958, Ser. No. 733,782
8 Claims. (Cl. 259—40)

This invention relates to a dough mixing machine and more specifically provides a device for mixing yeast containing doughs and is a continuation-in-part of our co-pending application Serial No. 492,406, filed March 7, 1955, now abandoned, for Yeast Raised Dough Mixing Method and this application is a substitute for Serial No. 464,342, now abandoned.

An object of this invention is to provide a dough mixing machine that combines the mixing and kneading operation into a single operation thereby reducing the amount of heat generated and eliminating the general use of ice in the baking industry.

Another object of this invention is to provide a more uniform dough mix in the shortest period of time thereby forming an efficient dough mixer that will provide a smoother bakery product that is even in texture and uniform as to air holes, thereby providing and producing a greater volume of product from a given weight of ingredients.

A further object of the present invention is to provide a dough mixing machine conformable to the preceding objects wherein revolving blades rotate about their own axis and at the same time rotate about a center axle or shaft thereby decreasing the time required to mix the ingredients as each particle is thoroughly intermingled with each other particle in the mix during the operation of the mixer.

Yet another important object of the present invention is to provide a dough mixing machine that does not build up heat during the mixing operation as the blades revolve on a main shaft and intermingle the particles through stretching and compressing the dough thereby reducing the heat caused by the mixing operation and controlling the action of the yeast containing dough.

Yet another important object of the present invention is to provide a dough mixing machine that eliminates the separate mixing and kneading operations at two different speeds which tends to increase the heat of friction.

Other important features of the present invention will be found in its simplicity of construction, compactness of operation, efficiency, friction reducing operation, its adaptability to its purpose, and its relatively inexpensive manufacture, installation and maintenance cost.

Figure 1:
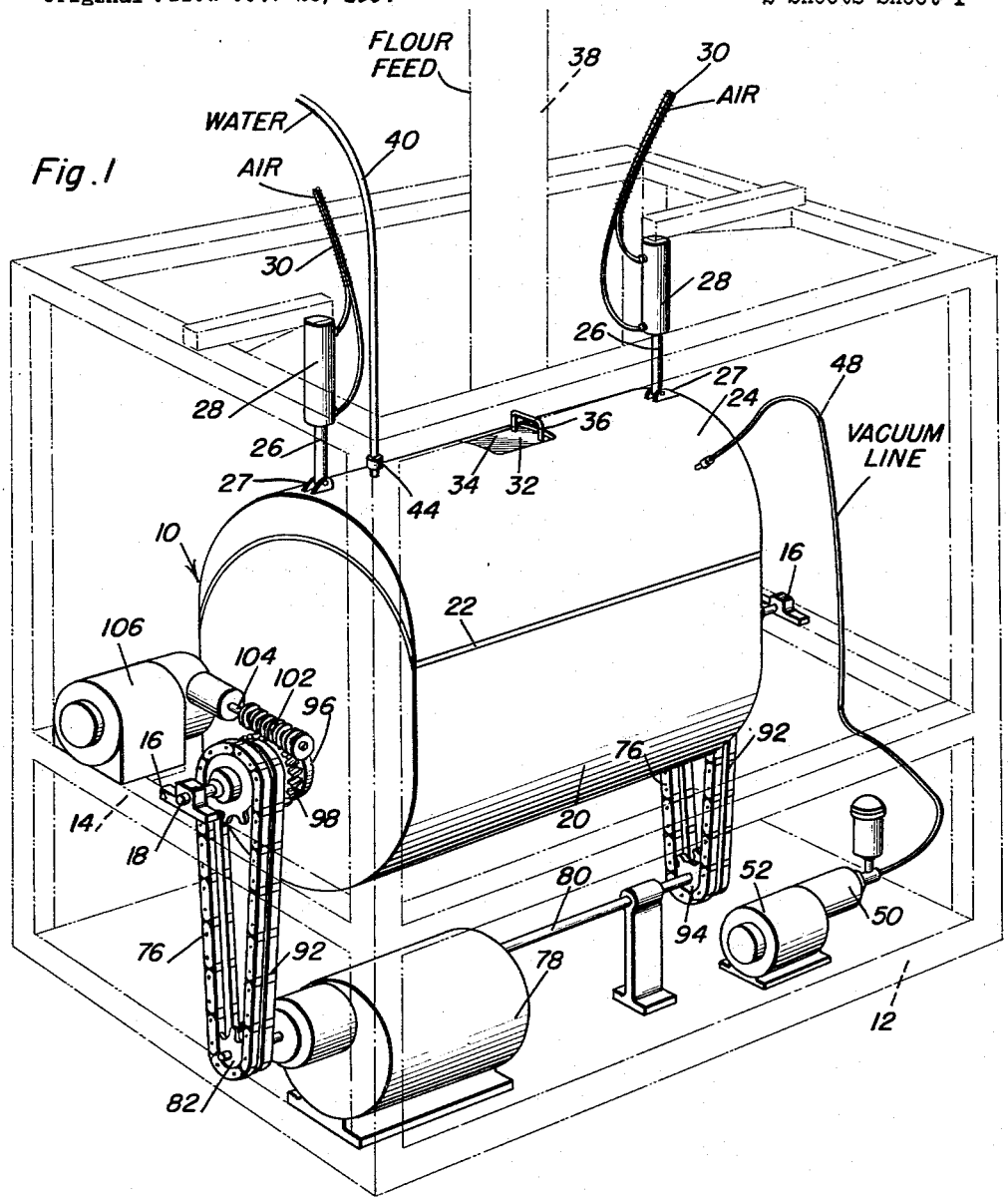
Figure 2:
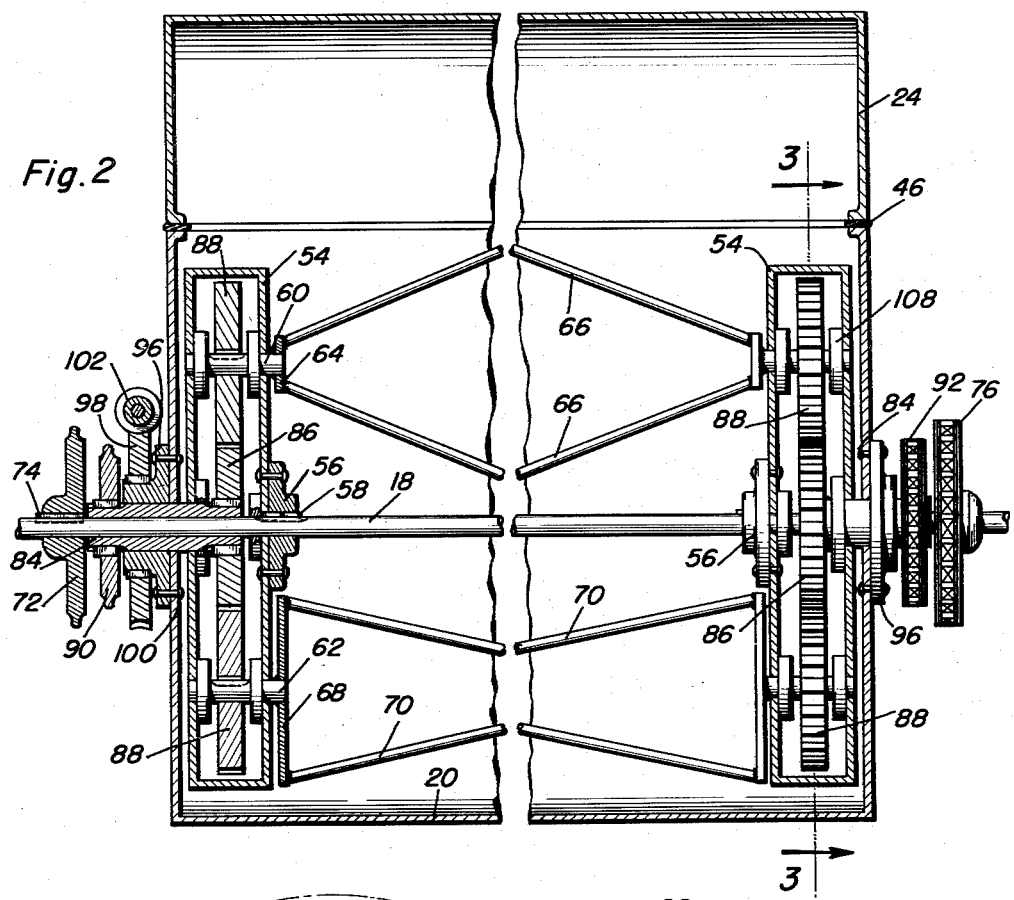
Figure 3:
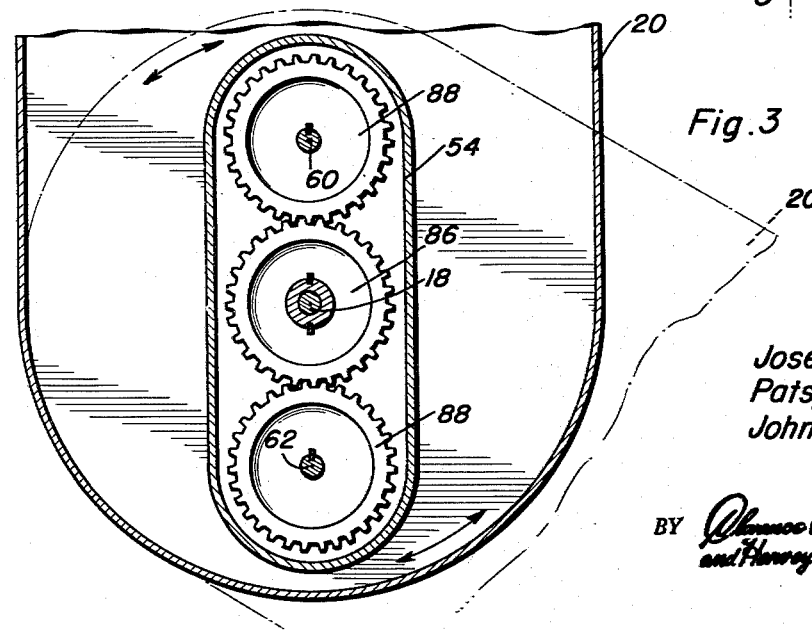

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing the dough mixing machine of the present invention mounted in conjunction with all of its attachments;

FIGURE 2 is a longitudinal, vertical sectional view taken substantially along a longitudinal center line passing through the dough mixing machine of the present invention showing the details of construction thereof and the relationship of the revolving rotating blades; and FIGURE 3 is a transverse, vertical sectional view taken substantially upon a plane passing along section line 3—3 of FIGURE 2 showing the structural details of the driving means for the rotating revolving blades wherein the ingredients will be thoroughly intermingled due to the action of these blades.

Referring now specifically to the drawings, it will be seen that the numeral 10 generally designates the dough mixing machine of the present invention. The machine 10 is mounted in a suitable framework as indicated by the numeral 12 wherein the framework generally surrounds the dough mixing machine and includes transverse members 14 for supporting bearing members 16 that pivotally journal a transverse shaft 18 on which an oval shaped enlarged casing 20 is pivotally mounted. The oval shaped casing 20 is provided with an open upper end as indicated by the numeral 22 and a generally arcuately curved top 24 is normally positioned over the opened upper end 22 of the casing 20. The top 24 is secured to a piston rod 26 by lugs 27 and the piston rod 26 is connected to a piston mounted in the cylinder 28 that is provided with suitable air hoses 30 for raising and lowering the top 24. It will be noted that a piston rod 26 and cylinder 28 is located at each end of the top 24 for vertical movement thereof wherein the top 24 may be moved upwardly off the open end of the casing 20 for permitting the casing 20 to be tilted about the shaft 18 for dumping. Centrally in the opening 24 is provided an enlarged aperture 32 having a sliding closure 34 with a handle 36 thereon for permitting entry of flour through a flour chute 38. A flexible water line 40 is connected through the top 24 by a fitting 44 thereby supplying water into the casing 20. Further, it will be noted that a seal 46 is provided between the closure 24 and the casing 20 thereby effectively sealing the closure top 24 onto the casing 20 during operation of the dough mixing machine 10. Also, a vacuum line 48 is connected through the top closure 24 and is connected to a vacuum pump 50 being driven by a suitable electric motor 52 thereby exhausting the air within the casing 20 wherein the bread mixing operation will be conducted in an evacuated area wherein a gage and control valve regulate the air evacuation.

Positioned at each end of the shaft 18 on the interior of the casing 20 is an elongated transverse member generally in the form of an oval shaped housing 54 that is rigidly secured to the shaft 18 by a hub member 56 and a longitudinal key 58 engaging the hub 56 and the shaft 18 thereby locking each of the housings 54 to the shaft 18 for rotation therewith. Positioned on one end of the housing 54 in an axle 60 and at the other end thereof is an axle 62 that are equally spaced from the shaft 18 and revolvable thereabout as the axles 60 and 62 are journaled in the housing 54. On the outer end of the axle 60 is a small plate 64 to which is secured a pair of outwardly bowed rods 66 that form a mixing blade. Secured to the other of the axles 62 on the outer end thereof is an enlarged plate 68 that is equipped with a pair of inwardly bowed rods 70 that form a revolving mixing blade wherein the rods 66 and 70 revolve about the center of the casing 20 as defined by the shaft 18. Secured to each outer end of the shaft 18 is a spur gear 72 secured thereto by a key 74 wherein the spur gears 72 are encircled by a driving chain 76 which is driven by an electric motor 78 having a drive shaft 80 extending from each end thereof and provided with a drive sprocket gear 82 in alignment with spur sprocket gears 72 wherein the gears 72 and the shaft 18 will be rotated thereby revolving the housing 54 and the sleeve formed by the rods 66 and 70 about the shaft 18. Extending through each side of the casing 20 is an elongated bearing member 84 that extends into the casing and into the housing 54 with the inner end of the bearing 54 being keyed to a driving gear 86. The driving gear 86 is in meshing engagement with driven gears 88 mounted respectively on the axles 60 and 62 thereby rotating the axles 60 and 62 about their axes and rotating the rods 66 and 70 about their respective axles 60 and 62. Keyed to the outer end of the bearing 84 is a sprocket gear 90 and the sprocket gear 90 is surrounded by a driving chain 92 that is driven by a suitable gear 94 secured to the shaft 80 of the motor 78. It is noted that each end of the shaft 18 is provided with a sprocket gear 72 and 90 and each end of the motor drive shaft 80 is provided with a sprocket gear 82 and 94 thereby driving the shaft 18 and the bearing 84 from each end of the casing 20. At one end of the casing 20 is secured a central hub 96 having a worm pinion gear 98 thereon wherein the worm pinion gear is keyed to the hub 96 and the hub 96 is secured to the casing 20 by fastening rivets 100. A worm gear 102 is mounted on a driving shaft 104 extending from an electric motor 106 wherein actuation of the worm gear 102 will turn the worm pinion gear 98 about its center thereby pivoting the casing 20 about the longitudinal axis of the shaft 18. It will be noted that the hub 96 is rotatably journaled on the bearing 84 and the bearing 84 is rotatably journaled on the shaft 18.

It will be understood that the gears 86 and 88 may revolve in an oil bath with suitable oil seals 108 in the necessary places. Further, it will be noted that the rods 66 and 70 will revolve about the axle 18 and rotate about the axles 60 and 62 in intermeshing and overlapping relation wherein the ingredients deposited in the casing 20 will be thoroughly mixed and kneaded during the same operation thereby reducing the friction and the heat produced thereby. The air evacuation by use of the gage and vacuum pump 50 will evacuate the interior of the casing 20 thereby reducing the temperature of the ingredients forming a smoother texture for the products of the dough mixing machine 10. Obviously the device may be constructed in any suitable size meeting the requirements of the individual installation and the various component parts may be constructed by utilizing well known manufacturing procedures.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A bread dough mixing machine comprising a horizonal shaft a hollow casing pivotally mounted on said horizontal shaft, mixing blades, means rigidly mounted on said shaft and rotatably supporting said mixing blades in spaced relation to said shaft, means for rotating said shaft thereby revolving said blades with said shaft, means for rotating said blades about their longitudinal axes, and means for tilting said casing for dumping, said shaft rotating means including a sprocket gear secured to the outer end of said shaft, said blade supporting means including a transverse hollow housing at each end of the shaft and journaling said blades, said blade rotating means including a sleeve carried by the shaft and extending through the casing in rotatable relation to the shaft and housing and extending into the housing, a gear secured to said sleeve and mounted in said housing, a driven sprocket gear on the end of said sleeve mounted exteriorly of said casing for driving the sleeve, a pair of gears in the housing in meshing engagement with said gear secured to said sleeve and mounted in said housing, an axle on each blade journaled in said housing, said pair of gears being mounted on said axles for driving said blades about their longitudinal axis while revolving about the axis of the shaft.

2. A dough mixing machine comprising a horizontal shaft, a hollow casing pivotally mounted on said horizontal shaft, mixing blades, means rigidly mounted on said shaft and rotatably supporting said mixing blades in spaced relation to said shaft, means for rotating said shaft thereby revolving said blades with said shaft, means for rotating said blades about their longitudinal axes, and means for tilting said casing for dumping, said casing being generally oval shaped having an open upper end, a top for closing the upper end of the casing, means for sealing the top to the casing, means for raising and lowering said top for permitting dumping of the casing, means for admitting ingredients into the casing, and vacuum means connected to the top for evacuating air from the interior of the casing thereby permitting controlled temperature of the ingredients while being mixed.

3. A dough mixing machine comprising a horizontal shaft, a hollow casing pivotally mounted on said horizontal shaft, mixing blades, means rigidly mounted on said shaft and rotatably supporting said mixing blades in spaced relation to said shaft, means for rotating said shaft thereby revolving said blades with said shaft, means for rotating said blades about their longitudinal axes, and means for tilting said casing for dumping, said casing being generally oval shaped having an open upper end, an arcuate top for closing the upper end of the casing, means for sealing the top to the casing, said shaft rotating means including a sprocket gear secured to the outer end of said shaft, said blade supporting means including housings mounted at each end of said shaft, said blade rotating means including a sleeve extending through the casing in rotatable relation to the shaft and into the housing, a gear secured to said sleeve and mounted in said housing, a driven sprocket gear on the end of said sleeve mounted exteriorly of said casing for driving the sleeve, a pair of gears in meshing engagement with the sleeve mounted gear, said pair of gears mounted on axles journaled in said housing and driving said blades.

4. A dough mixing machine comprising a horizontal shaft, a hollow casing pivotally mounted on said horizontal shaft, mixing blades, means rigidly mounted on said shaft and rotatably supporting said mixing blades in spaced relation to said shaft, means for rotating said shaft thereby revolving said blades with said shaft, means for rotating said blades about their longitudinal axes, and means for tilting said casing for dumping, said casing being generally oval shaped having an open upper end, an arcuate top for closing the upper end of the casing, means for sealing the top to the casing, means for raising and lowering said top for permitting dumping of the casing, means for admitting ingredients into the casing, and vacuum means connected to the top for evacuating air from the interior of the casing thereby permitting a controlled temperature of the ingredients, one of said blades formed of a pair of oppositely disposed outwardly bowed round rods, the other of said blades formed of a pair of oppositely disposed inwardly bowed round rods for defining an overlapping path of movement.

5. A dumping mixing machine comprising a hollow casing, means pivotally supporting said casing, a rotatable horizontal shaft positioned in said casing, a pair of spaced elongated members mounted on said shaft, a pair of mixing blades rotatably supported between the elongated members with the longitudinal axes being disposed in spaced parallel relation to the shaft, means for rotating said shaft and elongated member for revolving the mixing blades about the axis of said shaft, and means for rotating said mixing blades about their longitudinal axes, one of said blades including a pair of round rods having outwardly bowed central portions and converging end portions and the other of said blades including a pair of round rods having inwardly bowed central portions and diverging ends, the space between said pairs of rods being open for kneading dough.

6. A mixing and kneading machine for bread dough comprising an enlarged casing, an elongated horizontal shaft extending longitudinally through said casing, said shaft being rotatably supported for rotation about its longitudinal axis, said casing being journaled on said shaft for pivotal movement about the longitudinal axis of the shaft, said casing having an open top for dumping the contents thereof when rotated about the shaft, power operated means for rotating the casing about the shaft for dumping the contents thereof, a removable closure sealed to the top of the casing to permit dumping, means communicated with the top portion of the casing for evacuating air therefrom for cooling the bread dough while it is being mixed and kneaded thereby providing a smoother texture for the bread dough, a transverse member rigid with each end portion of the shaft disposed within the casing, a pair of agitators mounted between the ends of said transverse members for rotation about horizontal axes disposed in spaced parallel relation to the axis of rotation of the shaft, said agitators revolving about the axis of rotation of the shaft during rotation thereof, means for driving said shaft, means for driving said agitators, said driving means for the shaft being independent of the driving means for the agitators, each of said agitators including a pair of spaced rods with the path of movement of the rods of the respective agitators overlapping.

7. A mixing and kneading machine for bread dough comprising an enlarged casing, an elongated horizontal shaft extending longitudinally through said casing, said shaft being rotatably supported for rotation about its longitudinal axis, said casing being journaled on said shaft for pivotal movement about the longitudinal axis of the shaft, said casing having an open top for dumping the contents thereof when rotated about the shaft, power operated means for rotating the casing about the shaft for dumping the contents thereof, a transverse member rigid with each end portion of the shaft disposed within the casing, a pair of agitators mounted between the ends of said transverse members for rotation about horizontal axes disposed in spaced parallel relation to the axis of rotation of the shaft, said agitators revolving about the axis of rotation of the shaft during rotation thereof, means for driving said shaft, means for driving said agitators, said driving means for the shaft being independent of the driving means for the agitators, each of said agitators including a pair of spaced rods with the path of movement of the rods of the respective agitators overlapping, said transverse member being generally in the form of a hollow housing, each agitator having end axles rotatably received in said housings, said drive means for the agitators including a sleeve journaled on said shaft and extending from the exterior of the casing into the housing, means connected to the outer end of said sleeve for drivingly rotating same, said sleeve having a gear on the inner end thereof, each axle having a gear thereon in meshing engagement with the gear on the inner end of the sleeve for rotating the agitators about their longitudinal axes in timed relation.

8. The combination of claim 7 wherein the pair of rods on one agitator have central portions spaced a distance greater than the space between the end portions, and the pair of rods on the other agitator have central portions spaced a distance less than the space between the end portions, the area between the rods being free of obstructions whereby the rods will mix and knead the dough during rotation thereof and during movement about the shaft.

References Cited in the file of this patent

UNITED STATES PATENTS

| | | |
|---|---|---|
| 52,518 | Blasse | Feb. 13, 1866 |
| 875,234 | Avram | Dec. 31, 1907 |
| 1,005,769 | Chambers | Oct. 10, 1911 |
| 1,228,550 | Goger | June 5, 1917 |
| 1,429,747 | Lyngar | Sept. 19, 1922 |
| 1,535,204 | Darrak | Apr. 28, 1925 |
| 1,661,940 | Green | Mar. 6, 1928 |
| 1,678,193 | Notz et al. | July 24, 1928 |
| 2,155,454 | Temple | Apr. 25, 1939 |
| 2,547,092 | Poure | Apr. 3, 1951 |
| 2,604,617 | Dietz | July 22, 1952 |
| 2,792,304 | Pavan | May 14, 1957 |

FOREIGN PATENTS

| | | |
|---|---|---|
| 339,990 | France | May 2, 1904 |
| 568,094 | Great Britain | Mar. 19, 1945 |